United States Patent
Al-Hawaj

(10) Patent No.: US 6,773,226 B2
(45) Date of Patent: Aug. 10, 2004

(54) ROTARY WORK EXCHANGER AND METHOD

(76) Inventor: Osamah Mohamed Al-Hawaj, P.O. Box 15462, Daiyah (KW), 35455

(*) Notice: Subject to any disclaimer, the term of this patent is extended or adjusted under 35 U.S.C. 154(b) by 168 days.

(21) Appl. No.: 10/245,125

(22) Filed: Sep. 17, 2002

(65) Prior Publication Data
US 2004/0052639 A1 Mar. 18, 2004

(51) Int. Cl.[7] .......................... F01D 15/08; F04B 35/00
(52) U.S. Cl. ...................... 415/116; 415/202; 417/269; 417/393; 417/401; 91/503; 91/499
(58) Field of Search ................................ 415/115, 116, 415/202; 417/269, 393, 399, 401; 91/503, 499

(56) References Cited

U.S. PATENT DOCUMENTS 3,431,747 A  *  3/1969  Hashemi et al. .............. 62/123
4,887,942 A  * 12/1989  Hauge .......................... 417/64
6,537,035 B2 *  3/2003  Shumway ..................... 417/64

* cited by examiner

Primary Examiner—Ninh H. Nguyen
(74) Attorney, Agent, or Firm—David Kiewit

(57) ABSTRACT

An energy exchanger device can be used for exchanging pressure energy from one fluid to another, or may act as a hydraulic compressor or fluid driven pump. A preferred device uses a jet nozzle to rotate a cylindrical rotor block having a number of axially oriented conduits within it. As the rotor turns, one end of each of the conduits is alternately connected, through a first set of ports, to either an inlet for a high pressure fluid, or an outlet for the high pressure fluid from which the energy has been extracted. Correspondingly, the other end of each of the conduits is alternately connected to either an inlet for a low pressure fluid or an outlet for the fluid to which the energy has been transferred. A freely sliding element, such as a ball, may be placed in each of the conduits to isolate the two fluids from each other.

19 Claims, 13 Drawing Sheets

ROTARY WORK EXCHANGER AND METHOD

FIELD OF THE INVENTION

The invention generally relates to an energy recovery device of the positive displacement type that can be used to transfer energy from a first fluid at a higher pressure to a second fluid at a lower pressure. The invention specifically relates to the use of such an energy recover device in the process of desalination by reverse osmosis, where the device is used to transfer a portion of the energy from rejected brine to the incoming feed. Other applications include the use of the device as a fluid driven pump or a hydraulic compressor.

BACKGROUND

This invention relates to energy recovery devices, and particularly to those used in the desalination of seawater by the reverse osmosis method. The recovery problem is of vital importance in desalination by reverse osmosis. Fluid pressure energy recovered from high pressure rejected brine is utilized for the pressurization of the feed flow. Prior art energy recovery devices used in reverse osmosis systems may be classified as mechanical assistants, hydraulic driven boosting pumps and work exchangers.

A mechanical assistant commonly has the prime pump, motor and energy recovery turbine mounted on a common shaft. The turbine can either be a Pelton type or a reverse running centrifugal pump (Francis turbine). The overall efficiency of such devices is of the order of 60%.

A hydraulically driven boosting pump, sometimes called a turbocharger, is usually mounted on the same line as the primary pump in order to carry a portion of the required load. The rotating member in these devices comprises a turbine impeller fixedly coupled to a pump impeller within a common housing. This scheme has an estimated overall efficiency between 60–70%.

A work exchanger uses the rejected brine to positively pressurize an approximately equal amount of brackish feed water. One subset of this type employs a number of stationary cylinders with floating pistons and a control mechanism for synchronizing the opening and closing of valves. A second subset uses a spinning rotor with a multiplicity of channels. Work exchangers have an estimated overall efficiency between 80%–90%.

The mechanical assistants and hydraulic booster pumps involve the conversion of hydraulic energy into mechanical energy, which is then converted back to hydraulic energy. Work exchangers, on the other hand, directly transfer the hydraulic energy of one fluid (rejected brine) to hydraulic energy of the second fluid (feed), and are hence more efficient. The present invention falls within this category, i.e. a positive displacement, or work exchanger, energy recovery device. Examples of prior art devices of this sort include one taught in U.S. Pat. No. 3,791,768 which uses opposed piston/diaphragm pumps. The primary drawback of these devices is a restriction in the amount of fluid that can be handled, which renders such devices best suited to relatively small installations. Other energy recovery devices employing pistons of different areas with connecting rods are shown in U.S. Pat. No. 3,558,242 and in U.S. Pat. No. 6,017,200. Still another device of this sort uses a system of cylinders with freely moving pistons synchronized by a complex system of valves, and is shown in U.S. Pat. No. 5,797,429.

The main drawback of prior art work exchange devices is that they require a complex mechanism to control the opening and closing of valves as well as a mechanism for synchronizing various piston movements.

In addition to the energy recovery devices discussed above, there is also a class of devices in which pressure exchange takes place through direct contact between two fluid flows. Arrangements of this sort are shown in U.S. Pat. Nos. 5,988,993, 5,338,158 and 4,887,942 to Hauge. These devices have a cylindrical rotor comprising a plurality of open-ended axial channels spinning in a housing that is connected at both ends to intake and discharge ports of the differently pressurized fluids.

The main drawbacks of the prior art direct contact systems include uncontrollable internal mixing between the two flows, uncontrollable rotor speed, a complex water lubrication arrangement, axial alignment problems, lack of flexibility to deal with varying loads, and constraints on overall dimensions.

SUMMARY OF THE INVENTION

A preferred embodiment of the present invention accomplishes energy recovery through a positive displacement rotary device. In a preferred embodiment of this device, a small portion of the high pressure energy fluid is diverted through a nozzle to impinge on blades externally attached to the cylindrical rotor block, causing it to rotate. The bulk of the high pressure fluid is conveyed to axial channels within the block in order to pressurize the low pressure fluid within those channels. In some embodiments the two fluids are physically separated by freely sliding piston elements; in others no sliding elements are used and the pressure exchange is made through direct contact of the two fluids. The preferred axial channels are closed at both ends and have radially inward directed openings, one adjacent each end. Each of these openings alternately registers with axially aligned intake and discharge ports within a central stationary member so that at any given instant a single channel communicates with an intake port of one fluid and a discharge port of a second fluid. The sliding elements are arranged to freely reciprocate in respective channels in response to the alternate registering of the inward openings at the ends of the axial channels with intake and discharge ports in a central stationary member providing fluid connections for exchanging fluid flows. Each sliding element performs two strokes in the course of one complete revolution of the cylindrical block. Each stroke of the double acting sliding element comprises an intake of one fluid and a discharge of the second fluid. Alternatively, where no sliding elements are used, a fluid interface separating the two fluids acts as a sliding element.

A principal object of the present invention is to provide a device for use in a reverse osmosis desalinization plant to recover energy from waste brine flows and to deliver that energy to the feed flow.

One object of the present invention is to provide a hydraulically driven energy recovery device that does not require a separate driving means such as a motor.

Another object of the present invention is to provide an energy recovery device that does not require either a valve system or the associated electro-mechanical control mechanism needed to synchronize the opening and closing of valves.

Another object of the present invention is to provide an energy recovery device that can be used over a wide range of installation capacities.

Another object of the present invention is to provide an energy recovery device that minimizes the mixing of the two fluid flows.

Another object of the present invention is to provide an energy recovery device in which the speed of a rotating member is controlled manually by adjusting the flow rate of a fluid in a nozzle connected to an external valve.

Another object of the present invention is to provide an energy recovery device that is less costly to manufacture, easy to maintain and install in existing reverse osmosis systems than are prior art devices.

Still another object of the present invention is to provide an energy recovery device characterized by low fluid flow pulsation and vibration.

These and other objects and advantages of the present invention will be apparent from the following detailed description and the appended claims. It will be recognized that the foregoing description is not intended to list all of the features and advantages of the invention. Various embodiments of the inventions will satisfy various combinations of the objects of the invention and some embodiments of the invention will provide fewer than all of the listed features and satisfy fewer than all the listed objectives.

DETAILED DESCRIPTION OF THE INVENTION

Figure 1:
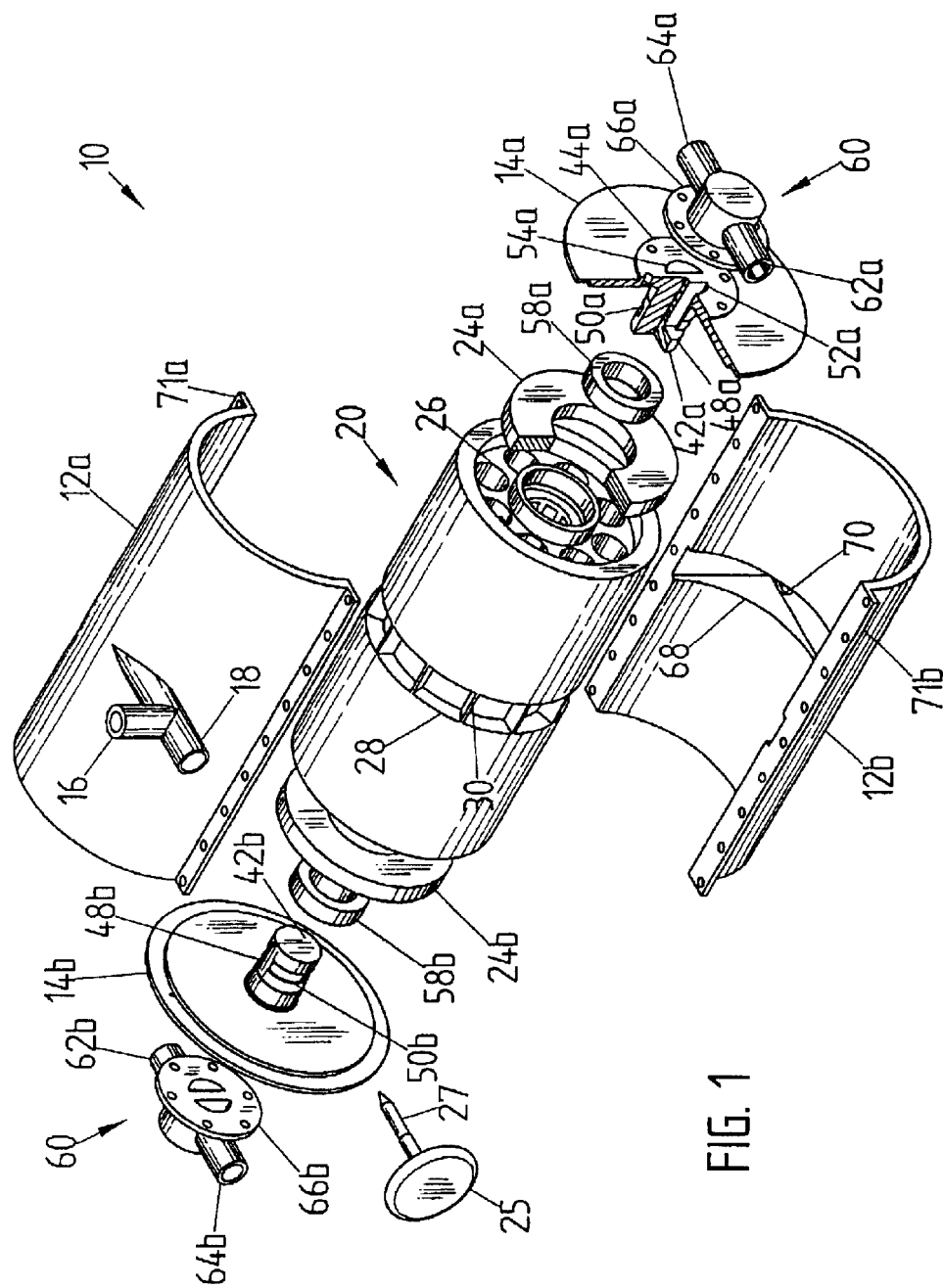
FIG. 1 is an exploded isometric view of a rotary work exchanger device of the invention.

In FIGS. 1–9 of the drawing, the principles of this invention are illustrated through its application as a work-exchanger device for recovering pressure energy from a high pressure fluid flow and transferring that energy to a low pressure fluid flow. Although a device of this sort is most commonly used for pressure exchange in reverse osmosis ("RO") systems, where the high and low pressure fluid flows respectively comprise the rejected brine outflow and the sea or brackish water feed, the device may also be employed as a turbocharger in internal combustion engines, a hydraulically driven pump, or a compressor.

A preferred rotary work exchanger device 10 comprises a housing defining a generally cylindrical interior comprising a middle portion that may be horizontally split into mating halves 12a, 12b fixed together at side flange portions 71a and 71b by suitable fixture means (not shown). The preferred middle portion is closed at both ends by end plates 14a and 14b attached to it by other suitable fixture means (not shown). The preferred housing comprises a medially disposed, tangentially positioned nozzle 17 for receiving an impelling fluid through an inlet 16. The nozzle may be regulated by a screw adjustable pin 27 fixed to a dial wheel 25 within a pipe fixture 18. In a preferred embodiment the internal peripheral wall of the housing comprises a recess portion 68 axially aligned with the nozzle for directing the spent jet fluid to a drainage outlet 70. The housing end plates may include centrally inwardly projecting core portions 42a and 42b, where each core portion comprises a respective pair of inlet and outlet passageways (52a, 54a) and (52b, 54b) connected to respective peripheral port pairs (48a, 50a) and (48b, 50b). Each pair of ports comprises a pair of angularly adjacent cutout openings defined within a transverse plane, and each cutout preferably encompasses substantially a 180-degree angular displacement on the peripheral surface of the cylindrical projection. The disposition of ports is made so that one pair of ports, defined in one transverse plane, is 180 degrees out of phase with a second pair of ports defined in a second transverse plane, and so that one inlet port of the first pair communicates, through a plurality of conduits 26, with an outlet port in the second pair. A fluid distributor 60, comprising an inlet line 62a and an outlet line 64a, may be fixedly attached to an outer wall of the end plate 14a by means of a flange portion 66a and a mating flange portion 44a. A similar fluid distributor comprising an inlet line 62b and an outlet line 64b may be fixedly attached to an outer wall of the end plate 14b by means of a flange portion 66b and a mating flange portion 44b. Each of the projecting portions 42a, 42b preferably comprises a respective stepped wall portion for mounting a respective bearing 58a, 58b.

Figure 2:
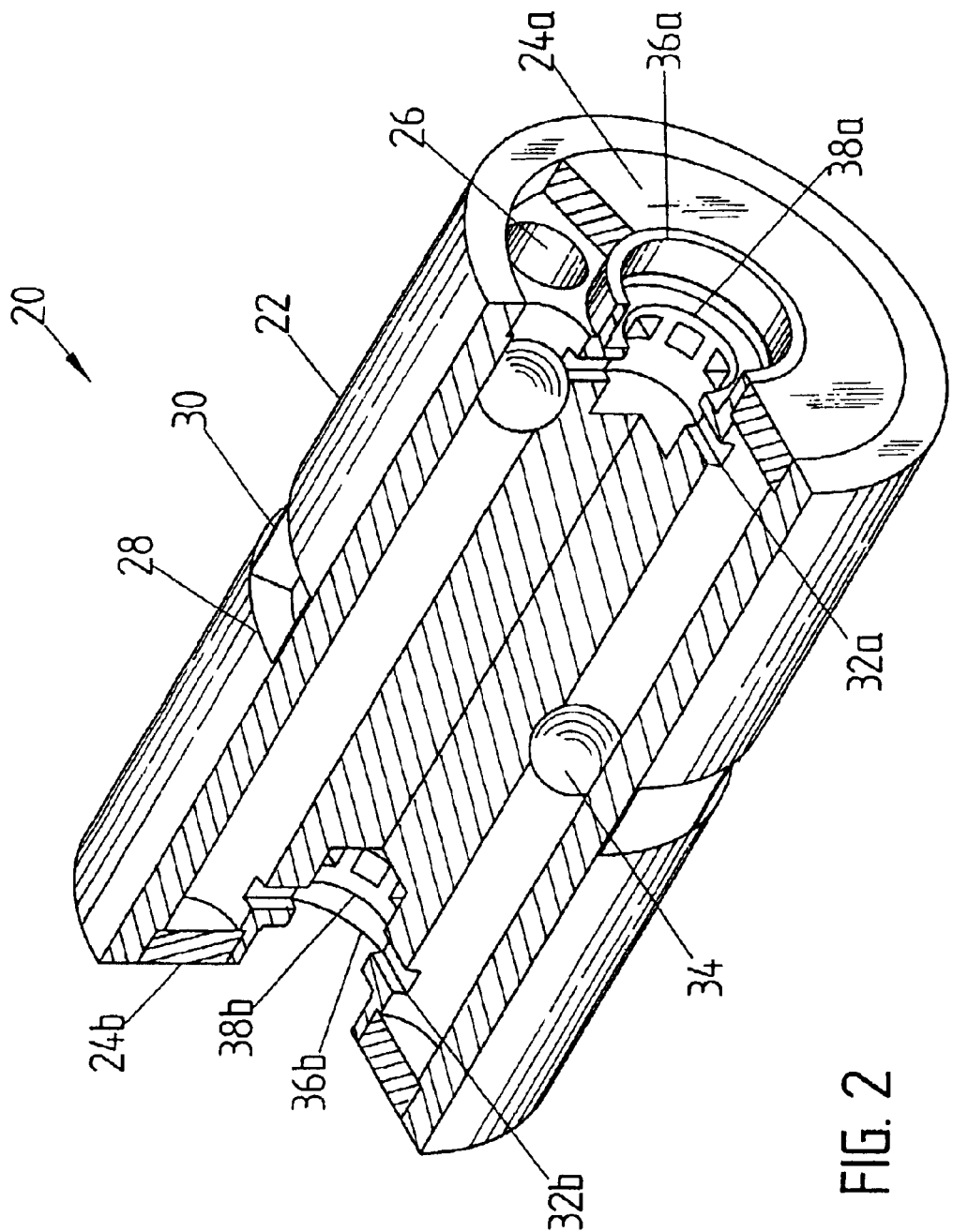
FIG. 2 is a partly cut-away isometric view of the rotor assembly of the rotary work exchanger device of FIG. 1.
Figure 3:
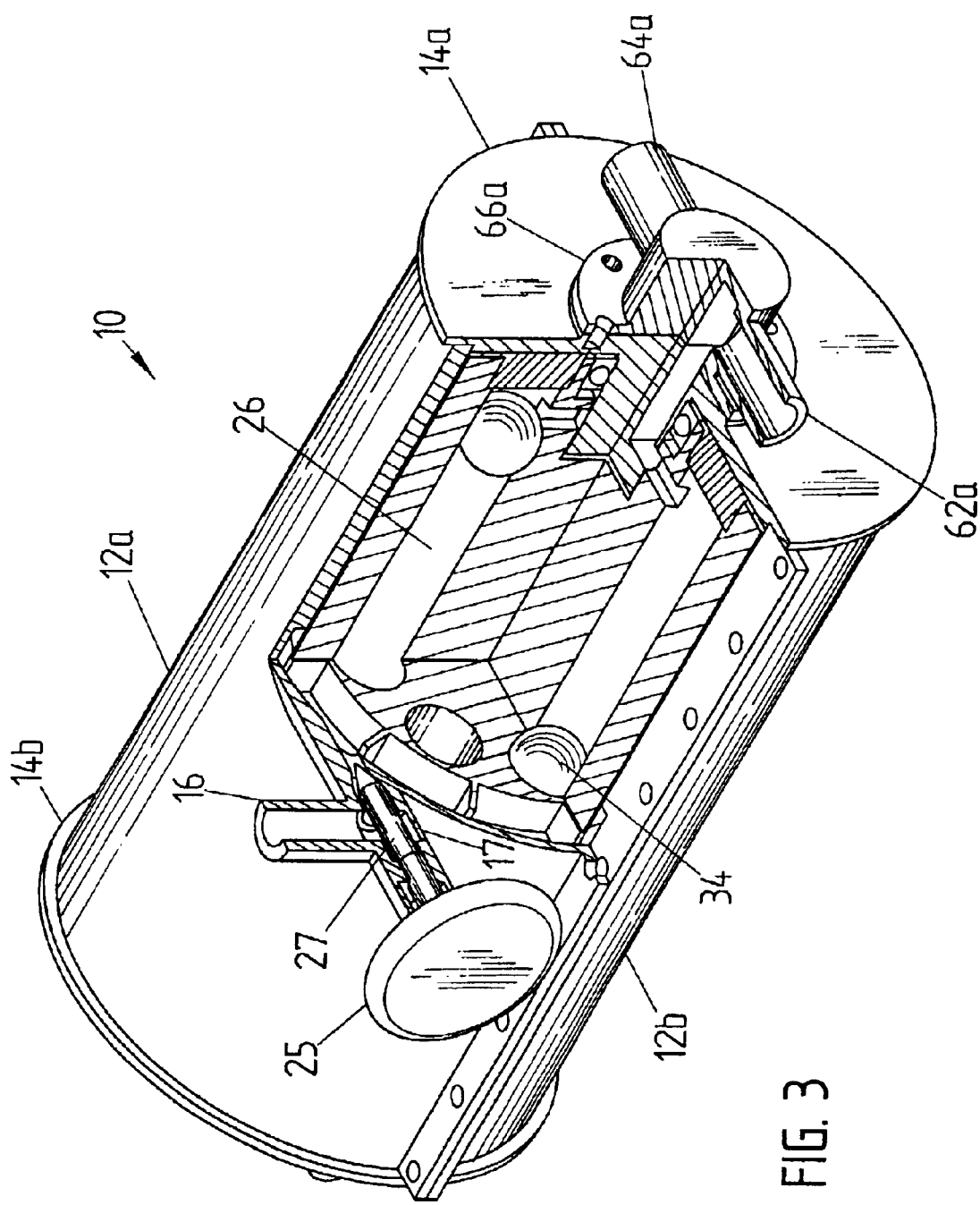
FIG. 3 is a partly cut-away isometric view of the rotary work exchanger device.
Figure 4:
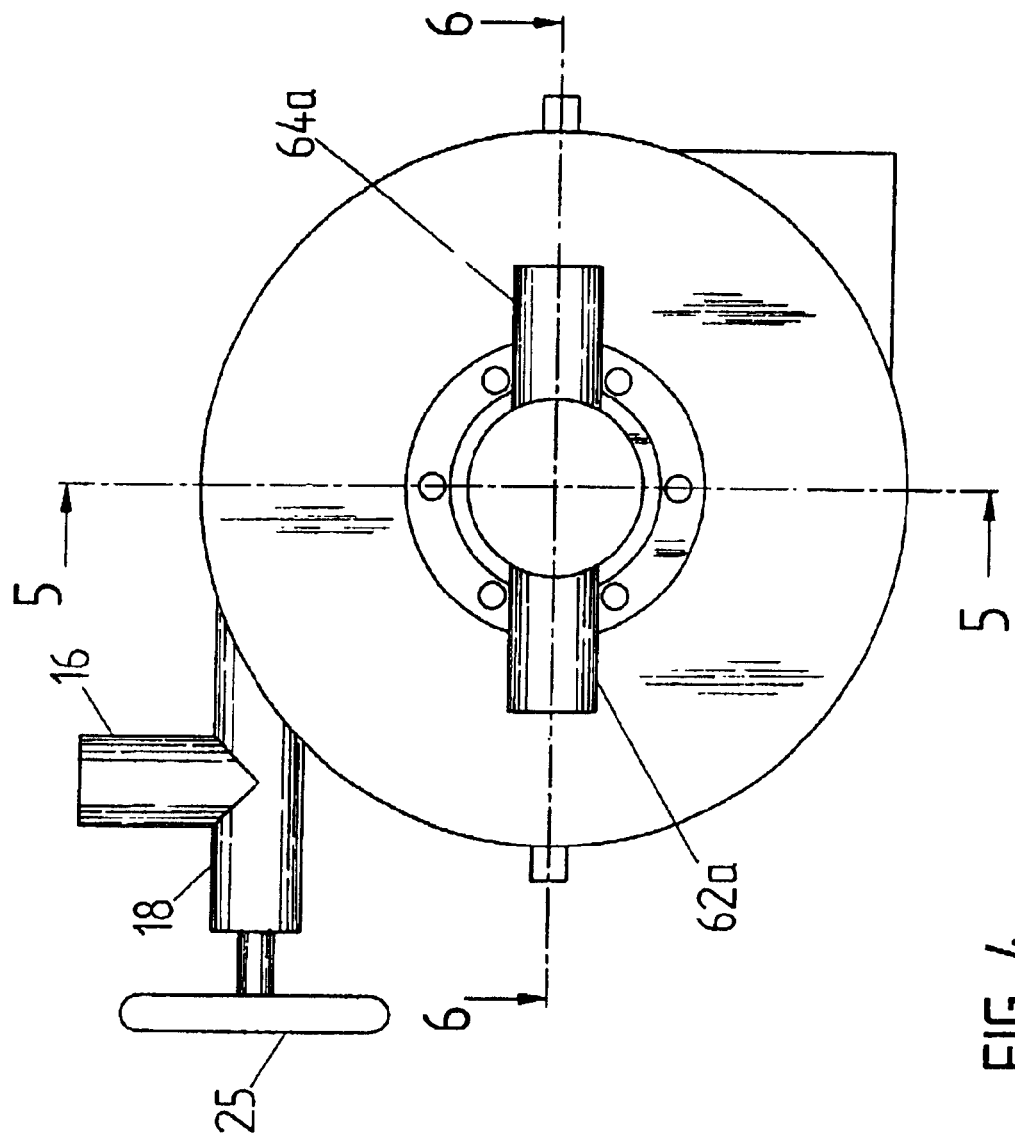
FIG. 4 is an end elevation view of the rotary work exchanger device of FIG. 1.

A preferred rotor assembly 20, as shown in FIG. 2, comprises a cylindrical block 22 having two centrally disposed end bores 38a and 38b. These bores rotatably enclose the projecting wall portions 42a and 42b and include internally recessed wall portions 36a and 36b for mounting respective bearings 58a, 58b. Furthermore, the preferred rotor assembly includes a multiplicity of axial conduits 26 disposed symmetrically about the axis of rotation of the assembly. Each of the preferred conduits 26 is closed at both ends by respective plates 24a, 24b that are attached by suitable fixture means (not shown). Radially inward openings 32a, 32b are respectively disposed proximal to each end of each conduit and open to the two respective central bores. Each opening is preferably axially aligned with the respective peripheral pair of intake and discharge ports in the centrally projecting end wall portion. Furthermore, each conduit may include a freely sliding piston element, such as a ball element 34, used to divide the conduit into two variable-volume working conduit elements. The outer peripheral wall of a preferred rotor block also comprises a circular array of blades 30 within a recess wall portion 28, where each blade 30 is axially aligned with a centerline of the nozzle.

Figure 5:
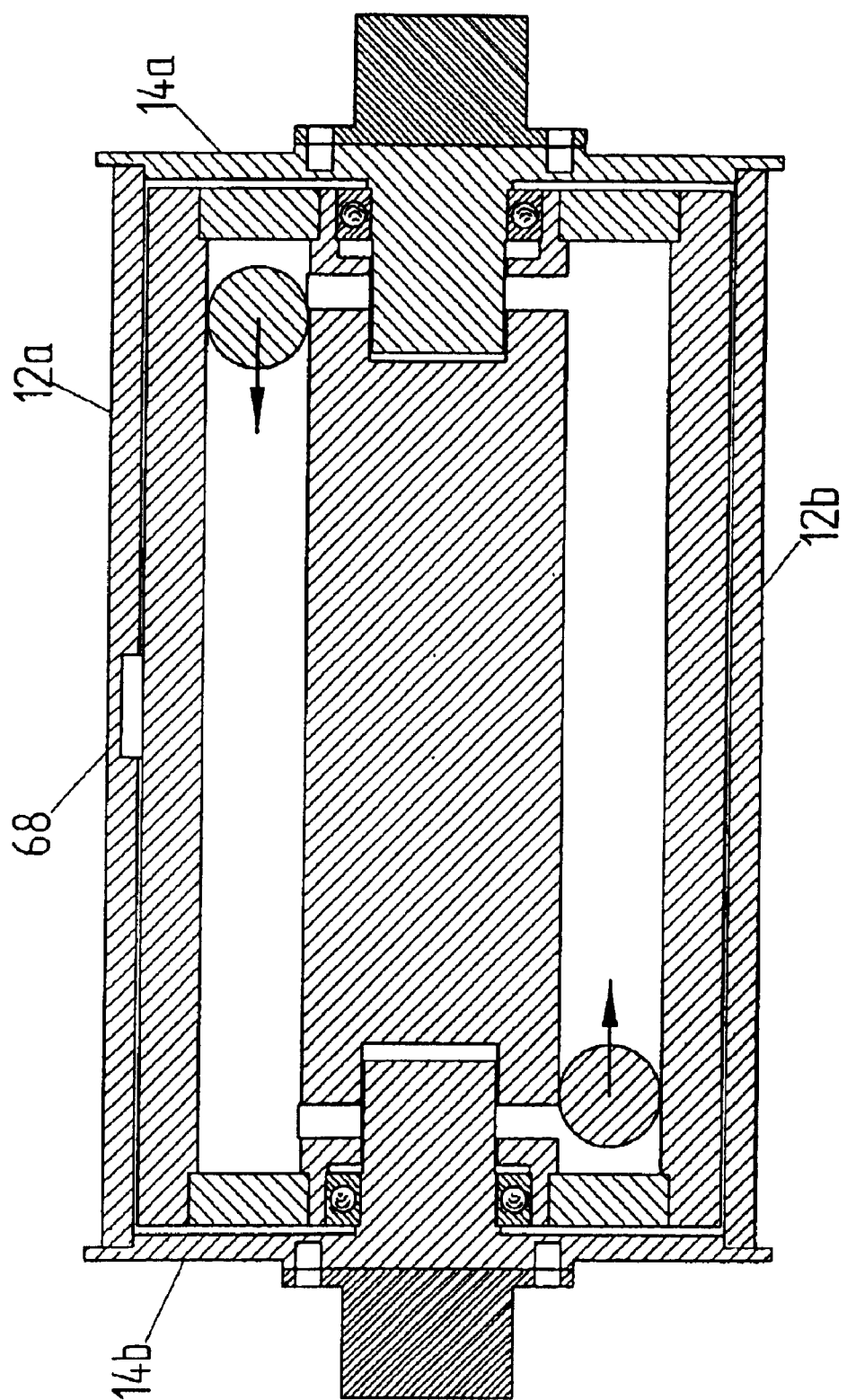
FIG. 5 is a sectional view taken along line 5—5 of FIG. 4.
Figure 6:
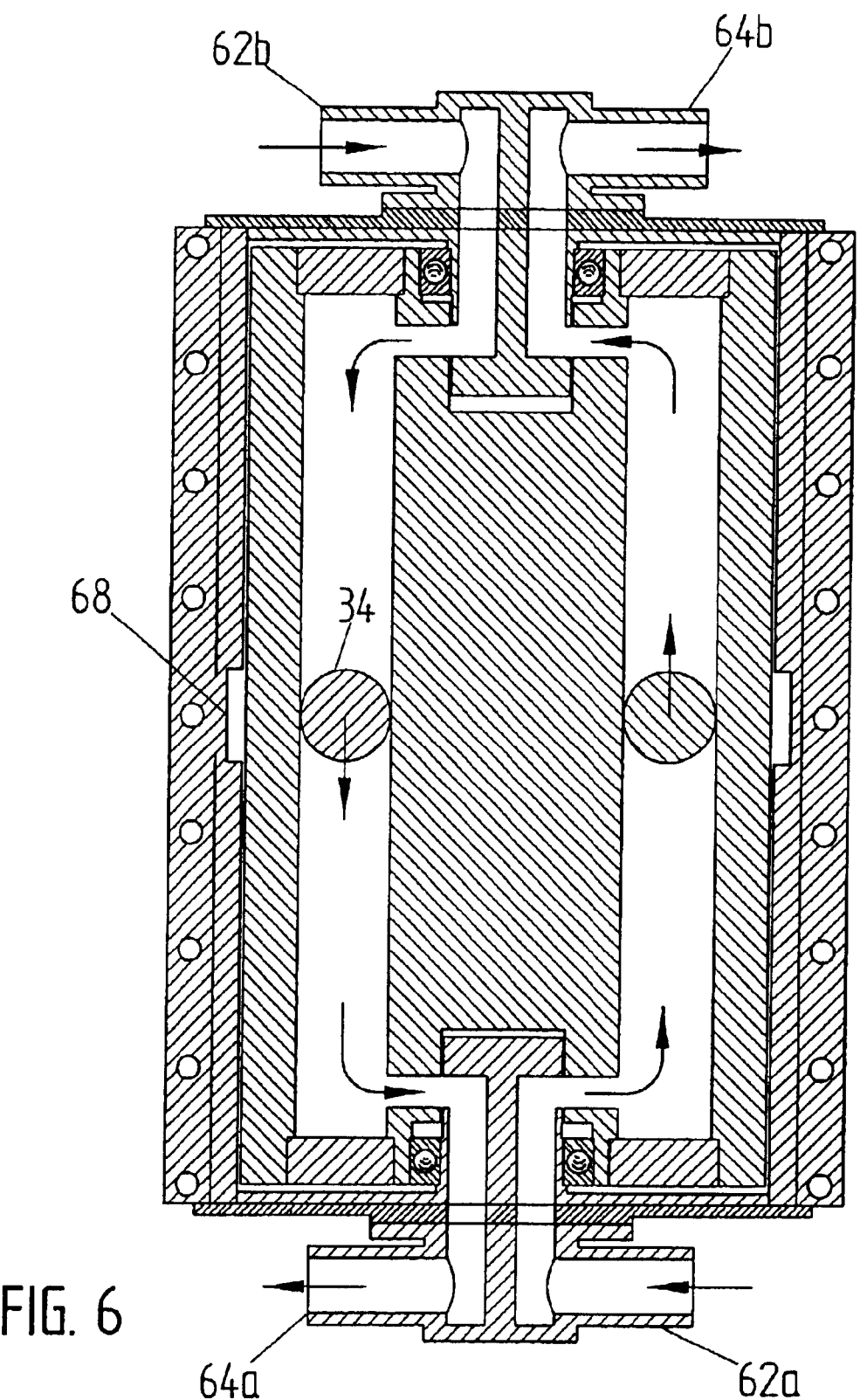
FIG. 6 is a sectional view, taken along line 6—6 of FIG. 4, of a work exchanger comprising sliding elements.
Figure 6A:
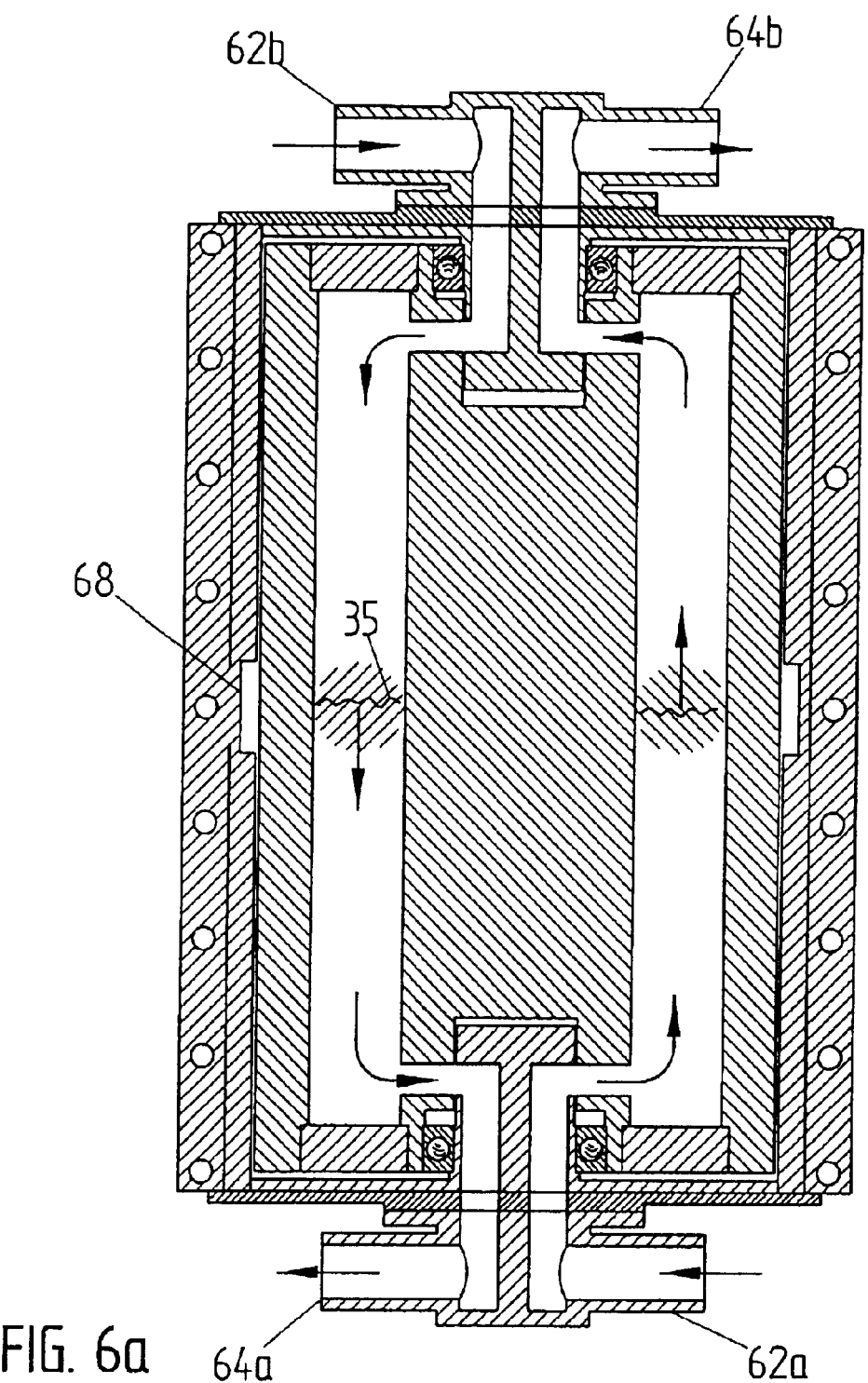
FIG. 6a is a sectional view, taken along line 6—6 of FIG. 4, of a work exchanger that has no sliding elements.
Figure 7:
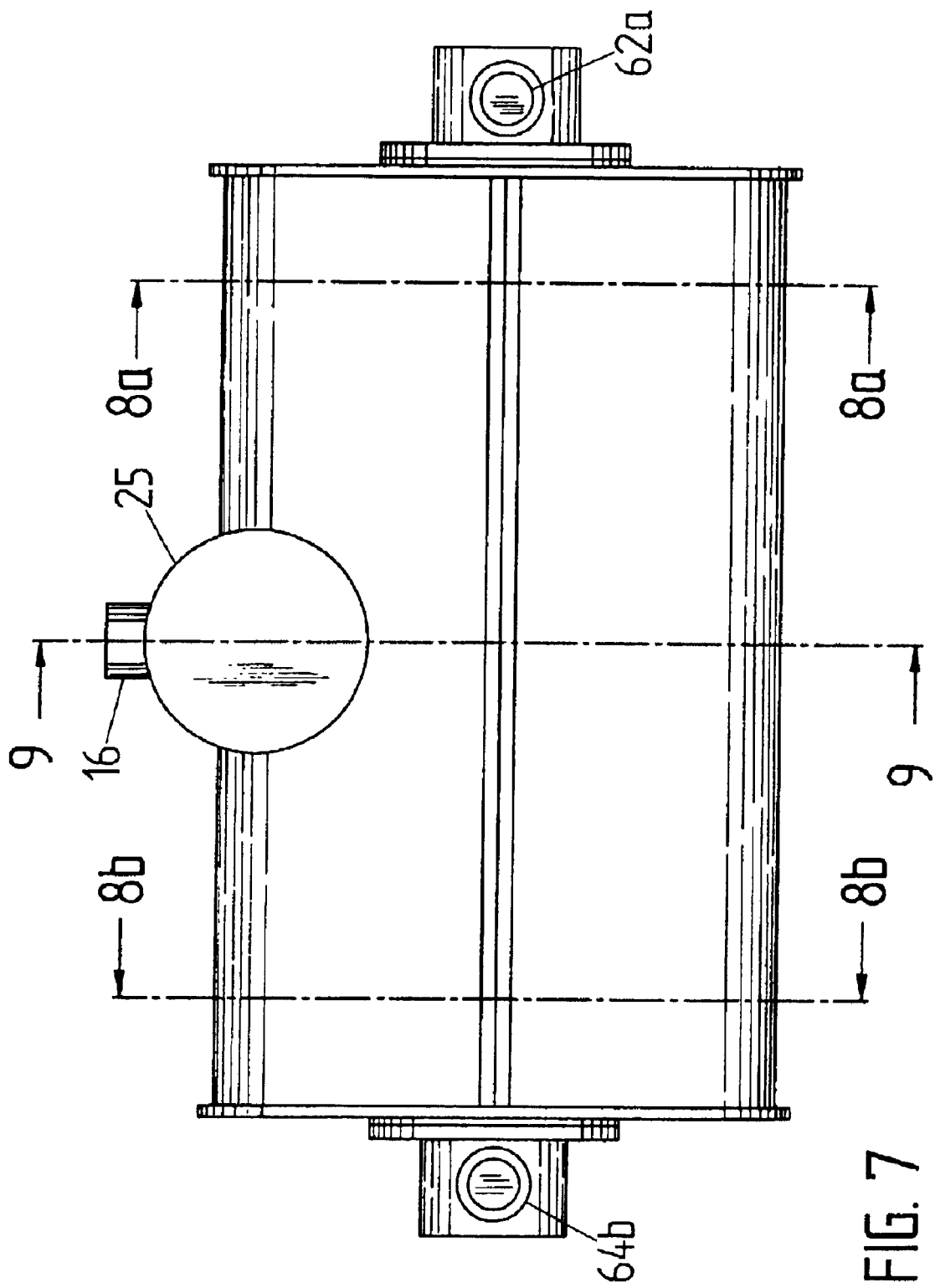
FIG. 7 is a side elevation view of the rotary work exchanger device of FIG. 1.
Figure 8:
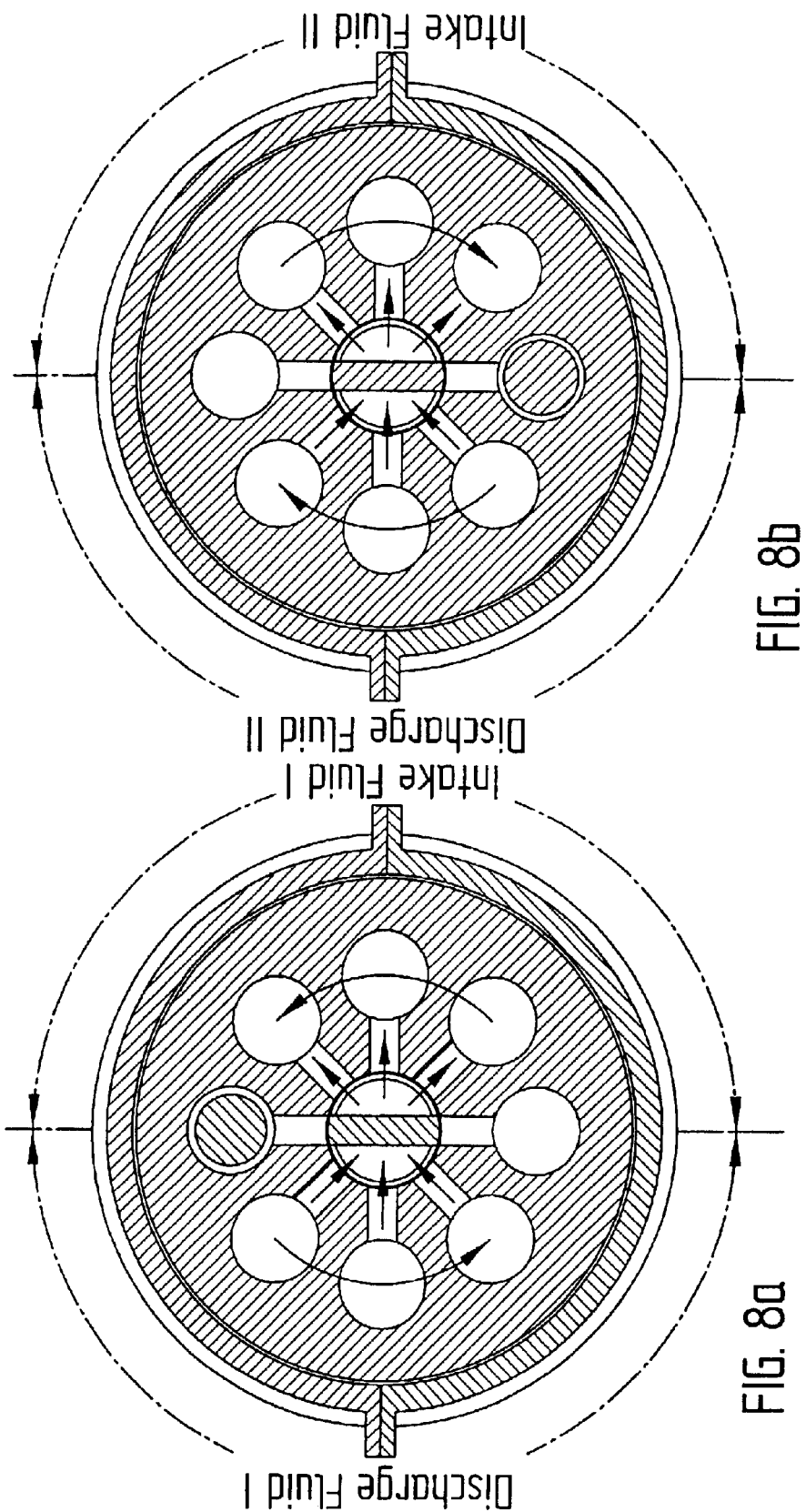
FIG. 8a is a sectional view taken along line 8a—8a of FIG. 7.
FIG. 8b is a sectional view taken along line 8b—8b of FIG. 7.
Figure 9:
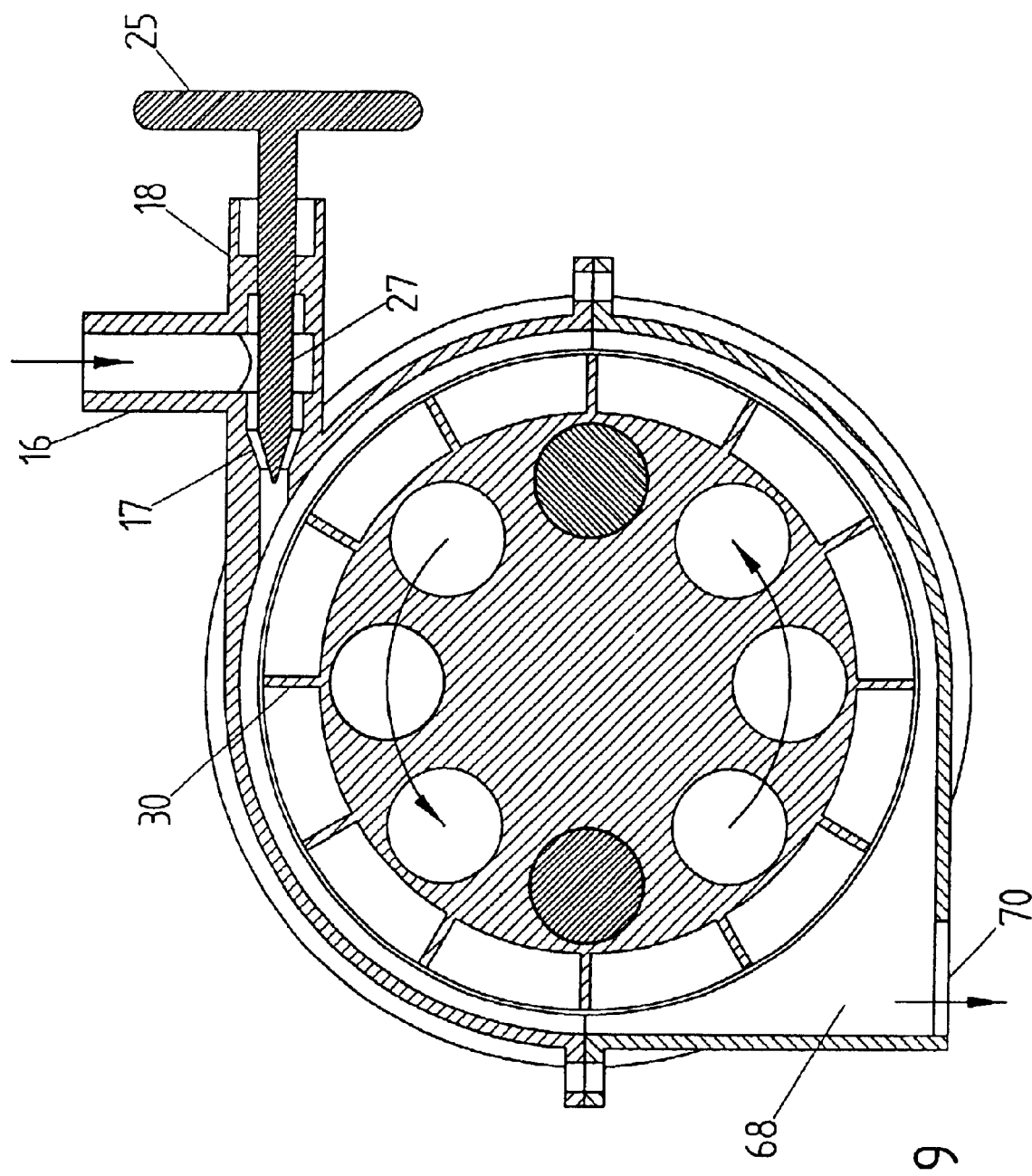
FIG. 9 is a sectional view taken along line 9—9 of FIG. 7.

The preferred rotary work exchanger device can work in at least two modes. One employs a system of freely sliding elements in respective conduits to physically separate the two fluids, as shown in FIG. 5 and FIG. 6. A second mode allows direct contact of the two fluids, as shown in FIG. 6a. In operation of a preferred apparatus, a portion of the high-pressure fluid is diverted to the nozzle line 16 and the flow rate is adjusted by means of a screw adjustable pin 27 used to vary the nozzle 17 flow area, through which the emerging impelling fluid jet impinges on the blade elements 30 to cause the rotation of the rotor assembly.

The operation of the preferred work exchanger, as shown in FIG. 5 through FIG. 8b, comprises two stroke phases. A pressurizing stroke phase, during which the rotor assembly advances through the first half of the cycle, is followed by a reverse depressurizing stroke phase during which the rotor assembly advances through the second half of the cycle. During each stroke a sliding element or, alternately, a moving interface, traverses a distance within the conduit corresponding to a stroke length. Adjusting the rotational speed of the rotor assembly by regulating the jet flow through nozzle 17 may control this stroke length. The pressurization stroke phase occurs when a conduit 26 has one of its end openings registered with an inlet port of the high pressure energy fluid and the other end opening registered with an outlet of the low pressure energy fluid. For example, this may involve a conduit 26 having one end inward opening 32a registering with one end inlet port 48a communicating with the high energy pressure fluid and a second end opening 32b registering with the second end outlet port 50b. During the pressurization phase, pressure energy is transferred from the high-pressure energy fluid to the low-pressure energy fluid across a sliding element, or alternately through direct fluid contact across a fluid interface traversing a stroke length. During the pressurization phase, the high-pressure fluid displaces the low-pressure fluid, thereby executing a simultaneous intake of high-pressure fluid and discharge of the low-pressure fluid as the sliding element or fluid interface moves a stroke length.

The depressurization stroke phase occurs when the conduit 26 has one of its end openings registered with an outlet port of the high pressure energy fluid and the other end opening registered with an inlet port of the low pressure energy fluid. For example, a conduit 26 having one end inward opening 32a registering with one end outlet port 50a, communicating with the high energy pressure fluid, and a second end opening 32b registering with the second end inlet port 48b of the low pressure energy fluid. During the depressurization phase, the low-pressure fluid displaces the depressurized high-pressure fluid, thereby executing a simultaneous intake of low-pressure fluid and discharge of the depressurized high-pressure fluid during which the sliding element or fluid interface traverses a reverse stroke length.

This alternate alignment of axial conduits with intake and discharge ports provides the inflow and outflow at both ends of axial conduits while the sliding elements or alternately, the fluid interface between the two fluids, axially reciprocates with respect to the axial conduits as the rotor rotates. As the rotor assembly makes one revolution, the sliding elements or fluid interface complete two stroke phases, a forward pressurization and a backward depressurization phase stroke.

In addition to operating as a work exchanger device for transferring fluid pressure from one fluid to another, the present invention can serve as a fluid driven pump in which the pressure energy of one high-pressure fluid is used to pressurize and pump another lower pressure energy fluid. Still another application is a hydraulic compressor in which the pressure energy of a high-pressure liquid is used to pressurize and compress another, gaseous, fluid by means of direct contact or, alternately, by means of freely sliding elements. Still another application is a turbocharger in internal combustion processes in which the exhaust gases of the combustion process are used partly to drive the rotor assembly and partly to compress the inlet air prior to its introduction into the combustion chamber.

Figure 10:
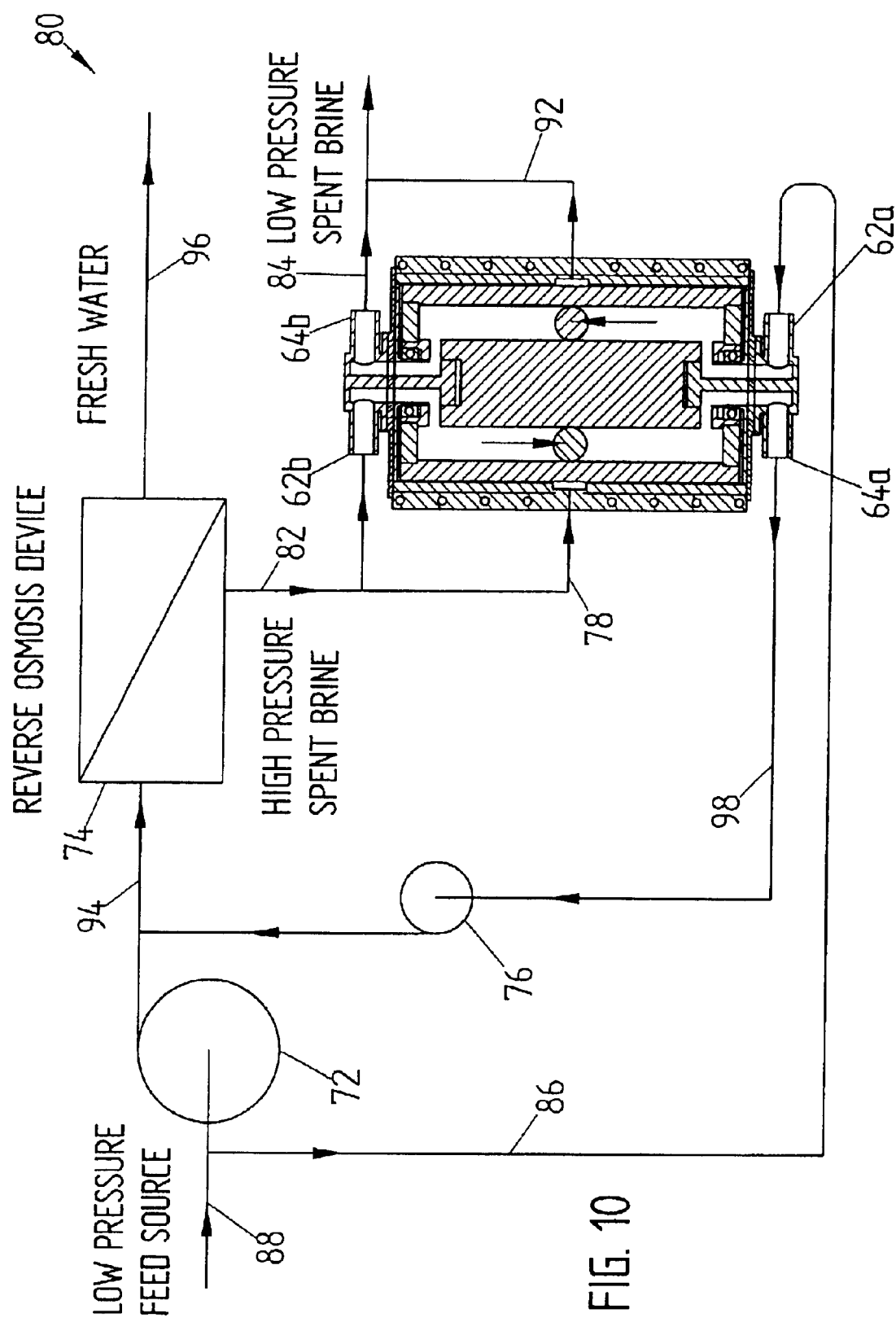
FIG. 10 is a schematic diagram of a work exchanger of the invention used in a reverse osmosis desalinization system.

FIG. 10 depicts a schematic arrangement for a reverse osmosis desalination plant system 80 using the work exchanger device 10 shown in FIG. 1. The overall plant comprises the actual reverse osmosis membrane module 74, a main feed pump 72, a booster pump 76 and a work exchanger device of the present invention. In this arrangement, a portion, which may be on the order of 40% of the total capacity, of a low pressure feed source, which may be seawater at a pressure of 2 bar, is conveyed through a line 88 to the main pump which increases the pressure to a higher value, which may be on the order of 60 bar. The remaining 60% of the low pressure fluid is diverted through a line 86 to the low pressure intake line 62a of the work exchanger device where it is pressurized to a pressure of 56 bar, discharged from an outlet 64a, and conveyed through a line 94 to a booster pump 76 for further pressurization to the feed pressure of 60 bar. In the reverse osmosis membrane module 74 the feed stream is converted to a low salinity stream, i.e., fresh water, that is output through a first output line 96 and a remainder, comprising an outflow of high salinity rejected brine, that is output through another line 82. The exiting spent brine accounts for 60% of the feed volume and usually has a high pressure; say 54 bar, which is conveyed to the work exchanger for energy recovery. A small portion of the spent brine, say 2%, is conveyed to the nozzle 16 through line a 78 to impart rotation to the rotor assembly. The rest of this fluid is conveyed to the high pressure intake 62b. The high-pressure rejected brine transfers its pressure energy to the low pressure feed stream and exits through an outlet 64b connected to the line 84 for disposal. The rejected brine portion used for driving the rotor assembly leaves the work exchanger through an outlet 70 and another line 92.

Figure 11:
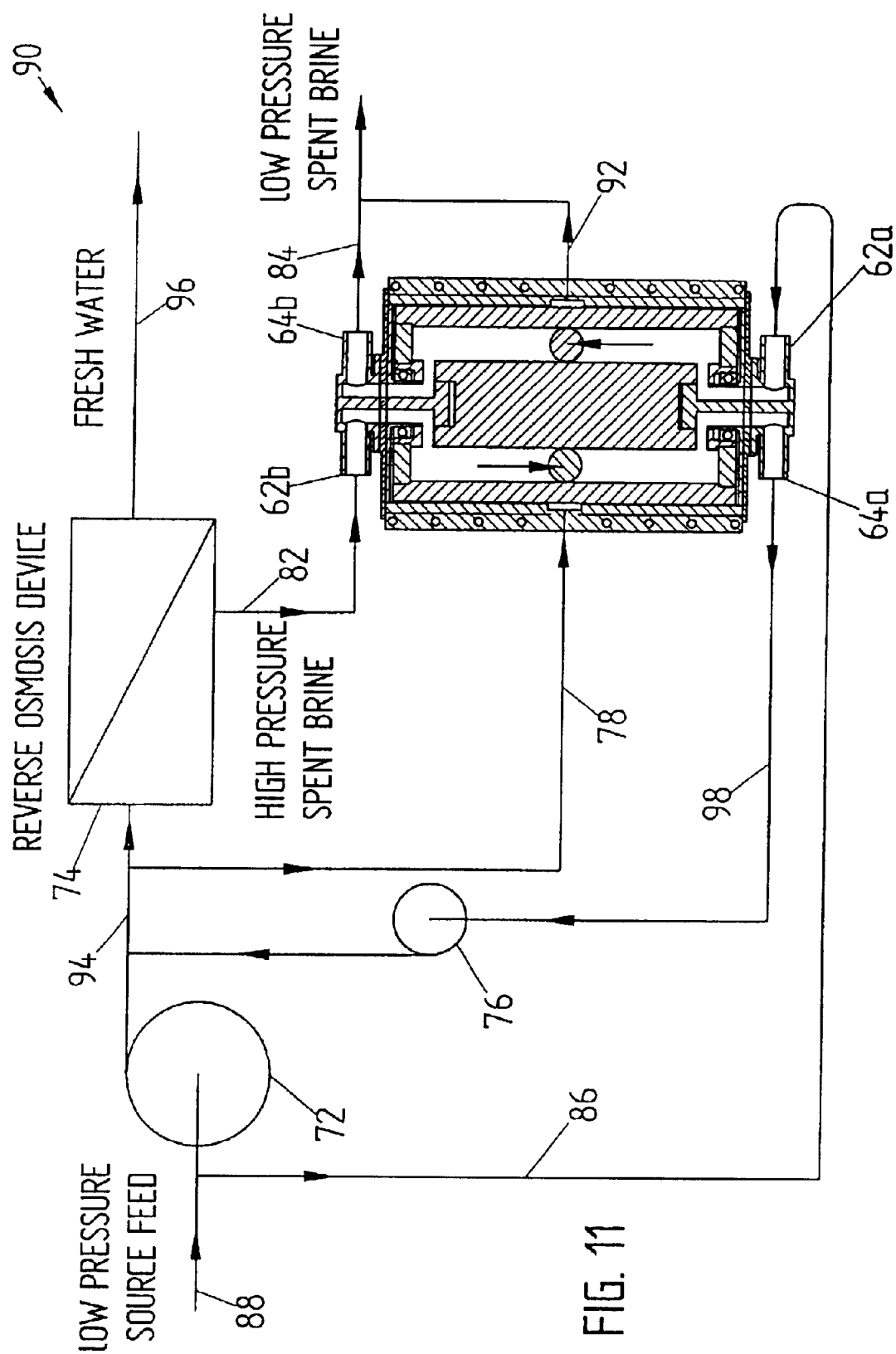
FIG. 11 is a schematic diagram for an alternative flow arrangement for the work exchanger used in a reverse osmosis desalinization system.
Figure 12:
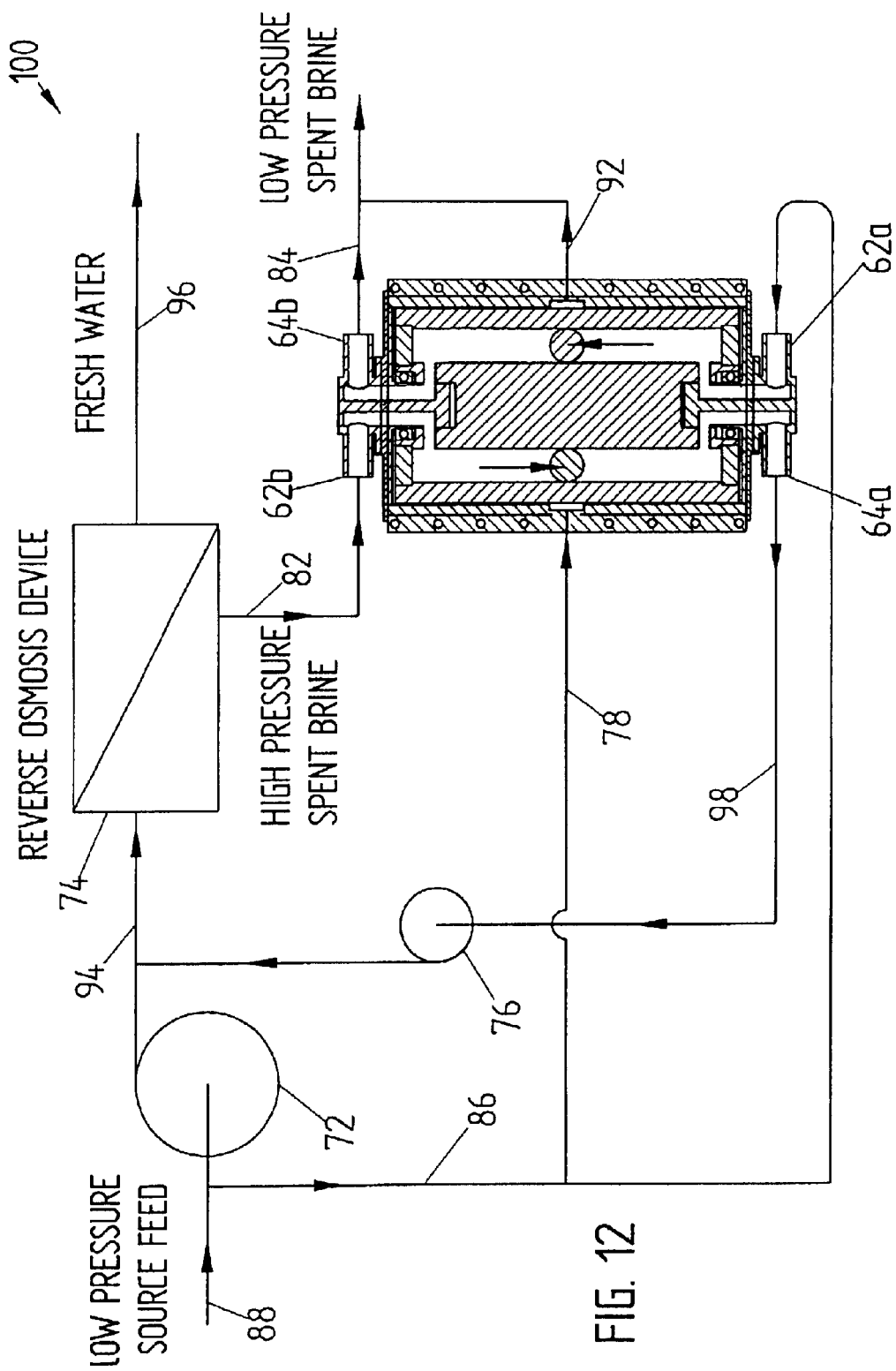
FIG. 12 is a schematic diagram for yet another work exchanger arrangement used in a reverse osmosis desalinization system.

Alternative schemes can be configured using an alternative fluid source for driving the rotor assembly. For example, FIG. 11 depicts an alternative arrangement of a reverse osmosis plant 90 in which a small portion of the high pressure feed from the main discharge line 94 from the main pump is conveyed through a line 78 to a nozzle 16 of the work exchanger device in order to impart rotation to the rotor assembly. Yet another alternative arrangement, depicted in FIG. 12, comprises a reverse osmosis plant 100 in which a portion of the low pressure source feed, initially input through a line 86, is diverted to a line 78 connected to the nozzle 16 and used to impart rotation to the rotor assembly.

As will be understood by those skilled in the art, various embodiments other than those described in detail in the specification are possible without departing from the scope of the invention will occur to those skilled in the art. It is, therefore, to be understood that the invention is to be limited only by the appended claims.

Having described the invention, I claim:

1. Apparatus for transferring energy from a high pressure fluid flowing from a respective source thereof to a low pressure fluid flowing from a respective source thereof, the apparatus comprising a housing defining a generally cylindrical interior having two ends, each of the ends having a respective end wall associated therewith;

two stationary cylindrical core portions, each extending from a respective one of the end walls into the interior, wherein a first of the core portions comprises a first pair of inlet and outlet ports, each of the first pair of inlet and outlet ports connected to a respective passageway proximal to a first of the two ends of the interior for communication with a source of the high pressure fluid; and the second of the core portions comprises a second pair of inlet and outlet ports, each of the second pair of inlet and outlet ports connected to a respective passageway proximal to the second end of the interior for communication with a source of the low pressure fluid;

a rotor assembly rotatably mounted within the interior for rotation about an axis, the rotor assembly comprising:

a respective central bore at each of its two ends, each of the central bores rotatably enclosing a respective one of the two stationary cylindrical core portions, the rotary assembly further comprising a plurality of axial conduits symmetrically disposed around the axis, each of the conduits comprising a respective opening to the central bore proximal each of its two ends, each of the openings axially aligned with that pair of the inlet and outlet ports adjacent the same end of the interior; and a plurality of blades for receiving an impelling fluid flow for imparting rotation to the rotor assembly.

2. The apparatus as of claim 1 further comprising a respective freely sliding piston element disposed in each of the conduits.

3. The apparatus of claim 2 wherein each of the freely sliding piston elements comprises a respective ball.

4. The apparatus of claim 1 wherein no freely sliding element is present in any of the conduits.

5. The apparatus of claim 1 further comprising at least one jet nozzle assembly disposed adjacent the blades and an outlet for withdrawing the impelling fluid that has passed through the nozzle.

6. The apparatus of claim 5 wherein the jet nozzle assembly includes means for adjusting the rate at which the impelling fluid flows through the nozzle.

7. The apparatus of claim 1 wherein each of the blades is fixedly attached to the rotor assembly and is axially aligned with a jet nozzle assembly.

8. The apparatus of claim 1 wherein the each of the central core portions comprises a respective stationary shaft portion fixedly attached to a respective end wall, each of the shaft portions rotatably enclosed by a respective one of the central bore portions of the rotor assembly.

9. The apparatus of claim 1 wherein at least one of the source of the high pressure fluid and the source of the low pressure fluid source comprises a source of a gaseous fluid.

10. The apparatus of claim 1 wherein the source of the high pressure fluid comprises a first portion of a rejected brine outflow from a reverse osmosis membrane module and the source of the low pressure fluid comprises a portion of a feed source input to a main feed pump for feeding the reverse osmosis module, the apparatus further comprising a jet nozzle connected to be fed by a second portion of the rejected brine outflow.

11. The apparatus of claim 1 wherein the source of the high pressure fluid comprises a rejected brine outflow from a reverse osmosis membrane module and the source of the low pressure fluid comprises a portion of a feed source fluid input to a main feed pump for feeding the reverse osmosis module, the apparatus further comprising a jet nozzle connected to be fed by a portion of a discharge of the main feed pump.

12. The apparatus of claim 1 wherein the source of the high pressure fluid comprises a rejected brine outflow from a reverse osmosis membrane module and the source of the low pressure fluid comprises a portion of a source feed fluid input to the main feed pump of the reverse osmosis module, the apparatus further comprising a jet nozzle connected to be fed by a portion of the feed source input to the main feed pump.

13. A method of transferring energy from a first fluid flowing from a high pressure fluid source to a second fluid flowing from a low pressure fluid source, the method comprising the steps of:

providing a rotor assembly having an axis, the rotor comprising a plurality of axially disposed conduits, each conduit having two respective ends, each conduit having a respective opening adjacent each of its respective ends, each of the openings adjacent a first end of the rotor assembly communicating with exactly one of a first inlet port communicating with the high pressure fluid source so as to receive the first fluid therefrom and a first outlet port for discharging the first fluid from which the energy has been extracted, each of the openings adjacent the second end of the rotor assembly communicating with exactly one of a second inlet port communicating with the low pressure fluid source so as to receive the second fluid therefrom and a second outlet port for discharging the second fluid to which the energy has been transferred;

communicating the first fluid from the high pressure fluid source to the first inlet port;

communicating the second fluid from the low pressure fluid source to the second inlet port;

providing a plurality of blades for receiving an impelling fluid flow for imparting rotation to the rotor assembly;

rotating the rotor assembly about the axis so as to alternately register each of the openings adjacent the first end of each of the conduits with the first inlet port and with a first outlet port, and further so as to alternately register each of the openings adjacent the second end of each of the conduits with the second inlet port and with a second outlet port; thereby transferring the energy from the first fluid to the second fluid;

receiving, at the first outlet port, the first fluid from which the energy has been transferred and communicating that fluid to a first outlet line; and receiving, at the second outlet port, the second fluid to which the energy has been transferred and communicating that fluid to a second outlet line.

14. The method of claim 13 wherein a portion of the first fluid is diverted through a nozzle to rotate the rotor assembly by impacting blades disposed thereon.

15. The method of claim 13 wherein a portion of the second fluid is diverted through a nozzle to rotate the rotor assembly by impacting blades disposed thereon.

16. The method of claim 13 wherein a portion of the second fluid is passed through a pump and then supplied to a nozzle to rotate the rotor assembly by impacting blades disposed thereon.

17. The method of claim 13 wherein the first fluid comprises at least a portion of a rejected brine stream from a reverse osmosis module, the second fluid comprises at least a diverted portion of a feed source input to a main feed pump feeding the reverse osmosis module and the second outlet line conveys the second fluid to which the energy has been transferred to a booster pump for additionally pressurizing the second fluid to a pressure level corresponding to a discharge pressure of the main feed pump.

18. An apparatus for transferring pressure energy from at least a portion of a rejected brine outflow from a reverse osmosis module to at least a portion of a feed source input to the reverse osmosis module, the apparatus having a high pressure end comprising a high pressure input port for receiving the at least a portion of the rejected brine outflow and a low pressure end comprising a low pressure input port for receiving the at least a portion of the feed source input; the high pressure end further comprising a first output port for discharging the at least a portion of the rejected brine outflow from which the pressure energy has been extracted; the low pressure end further comprising a second output port for port for discharging the at least a portion of the source feed to which the pressure energy has been transferred and for supplying that at least a portion of the source feed input to a booster pump that is not a portion of the apparatus;

the apparatus further comprising a rotary assembly comprising a plurality of cylinders disposed parallel to a common axis for rotation thereabout, each of the cylinders having a first respective opening adjacent the high pressure end of the apparatus for communicating, during substantially a first half of each rotation, with the high pressure input port and, during the second half of each rotation, with the first output port; each of the cylinders further having a second respective opening adjacent the low pressure end of the apparatus for communicating, during substantially the first half of each rotation, with the second output port, and, during the second half of each rotation with the low pressure input port; and a plurality of blades extending along the common axis for receiving an impacting flow of fluid for rotating the rotor assembly about the axis.

19. The apparatus of claim 18 wherein the impacting flow of fluid comprises one of a second portion of the rejected brine outflow and a second portion of the feed source input.

* * * * *